United States Patent
Ao (10) Patent No.: US 11,208,985 B2
(45) Date of Patent: Dec. 28, 2021

(54) CORRECTION METHOD AND APPARATUS FOR PREDICTED WIND SPEED OF WIND FARM

(71) Applicant: BEIJING GOLDWIND SCIENCE & CREATION WINDPOWER EQUIPMENT CO., LTD., Beijing (CN)

(72) Inventor: Juan Ao, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 681 days.

(21) Appl. No.: 16/072,085

(22) PCT Filed: Sep. 27, 2017

(86) PCT No.: PCT/CN2017/103689
§ 371 (c)(1),
(2) Date: Jul. 23, 2018

(87) PCT Pub. No.: WO2018/218832
PCT Pub. Date: Dec. 6, 2018

(65) Prior Publication Data
US 2021/0172421 A1 Jun. 10, 2021

(30) Foreign Application Priority Data
Jun. 2, 2017 (CN) .......................... 201710409151.6

(51) Int. Cl.
*F03D 7/04* (2006.01)
*G06Q 10/06* (2012.01)
*G06Q 50/06* (2012.01)

(52) U.S. Cl.
CPC .............. *F03D 7/045* (2013.01); *F03D 7/048* (2013.01); *G06Q 10/067* (2013.01); *G06Q 50/06* (2013.01);
(Continued)

(58) Field of Classification Search
CPC .. G06Q 50/06; F05B 2279/32; F05B 2279/80
(Continued)

(56) References Cited

U.S. PATENT DOCUMENTS

| 9,519,056 B2 | 12/2016 | Schroeder et al. |
| 2010/0023266 A1 * | 1/2010 | Stiesdal ................ F03D 7/0248 702/3 |

(Continued)

FOREIGN PATENT DOCUMENTS

| CN | 102880907 A | 1/2013 |
| CN | 102945508 A | 2/2013 |

(Continued)

OTHER PUBLICATIONS

International Search Report dated Mar. 5, 2018; PCT/CN2017/103689.
(Continued)

*Primary Examiner* — Md Abul Azad (57) ABSTRACT

A correction method and a correction apparatus for a predicted wind speed of a wind farm is provided according to the present disclosure. The correction method includes: establishing wind speed deviation matrixes of a plurality of existing wind farms respectively; establishing a wind speed deviation correction model library based on the plurality of wind speed deviation matrixes of the existing wind farms; determining relevant parameters of the target wind farm, determining a matched wind speed deviation correction model in the wind speed deviation correction model library based on the relevant parameters, and correcting the pre-
(Continued)

dicted wind speed of the target wind farm based on the determined wind speed deviation correction model.

9 Claims, 3 Drawing Sheets

(52) U.S. Cl.
CPC ....... *F05B 2270/32* (2013.01); *F05B 2270/80* (2013.01)

(58) Field of Classification Search
USPC .......................................................... 700/286
See application file for complete search history.

(56) References Cited

U.S. PATENT DOCUMENTS

| | | | | |
|---|---|---|---|---|
| 2013/0238244 | A1* | 9/2013 | Kang | F03D 7/048 702/3 |
| 2013/0259686 | A1* | 10/2013 | Blom | F03D 7/0276 416/1 |
| 2013/0320676 | A1* | 12/2013 | Kim | F03D 7/00 290/44 |
| 2019/0203696 | A1* | 7/2019 | Kaucic | F03D 7/028 |
| 2019/0345916 | A1* | 11/2019 | Stephen | F03D 7/048 |

FOREIGN PATENT DOCUMENTS

| | | |
|---|---|---|
| CN | 103996071 A | 8/2014 |
| CN | 104657584 A | 5/2015 |
| CN | 104794259 A | 7/2015 |
| CN | 106372801 A | 2/2017 |
| CN | 106650977 A | 5/2017 |
| CN | 107153894 A | 9/2017 |

OTHER PUBLICATIONS

Erik L. Petersen, et al; "Wind Power Meteorology. Part II: Siting and Models", Wind Energy, vol. 1, Issue 2, Dec. 1998, pp. 55-72.
Extended European Search Report dated Feb. 19, 2019; Appln. No. AB2086 EP S5.
The First Chinese Office Action dated Aug. 3, 2018; Appln. No. 201710409151.6.
Alfredo Pena et al.; "Charnock's roughness length model and non-dimensional wind profiles over the sea", Boundary-Layer Meteorology (2008), doi:10.1007/s10546-008-0285-y, pp. 1-12.
The First Australian Office Action dated Mar. 27, 2020; Appln. No. 2017395124.
The Second Australian Office Action date Aug. 27, 2021; Appln. No. 2020204536.

* cited by examiner

CORRECTION METHOD AND APPARATUS FOR PREDICTED WIND SPEED OF WIND FARM

CROSS-REFERENCE TO RELATED APPLICATIONS

This application is a National Stage application of PCT International Application No. PCT/CN2017/103689, titled "CORRECTION METHOD AND APPARATUS FOR PREDICTED WIND SPEED OF WIND FARM" filed on Sep. 27, 2017, which claims priority of Chinese Patent Applicant No. 201710409151.6, filed on Jun. 2, 2017, the disclosures of both of which are incorporated herein by reference in their entities.

FIELD

The present disclosure relates to a technical field of wind power, and in particular to a correction method and a correction apparatus for a predicted wind speed of a wind farm.

BACKGROUND

A simulation calculation of wind speeds of a whole wind farm is related to a selection of wind turbine types and an evaluation of power generation amount in the whole wind farm, and directly determines economic benefits of the wind farm. As the development of wind farms is increasingly moving to mountain areas where terrain and meteorological conditions are more complex, deviations of the wind speed and the power generation amount of the wind farm calculated based on an original fluid model, such as WT, Windsim, WAsP and so on are also increasing, and in some wind farms, the calculation deviation of the wind speed can even be up to 20%, which brings huge economic losses to the developers of the wind farms.

SUMMARY

A correction method and a correction apparatus for a predicted wind speed of a wind farm is provided according to the present disclosure. A predicted wind speed of a wind farm is corrected by using relationships between wind speed calculation deviations and a plurality of influence factors, to solve the problem that wind speed of the wind farm is inaccurately calculated based on existing fluid models.

A correction method for a predicted wind speed of a wind farm is provided according to an aspect of the present disclosure, where the correction method includes: establishing wind speed deviation matrixes of a plurality of existing wind farms respectively, where a wind speed deviation represents a difference between a predicted wind speed and a measured wind speed of a target anemometer tower of an existing wind farm; establishing a wind speed deviation correction model library based on the wind speed deviation matrixes of the plurality of existing wind farms, where the wind speed deviation correction model library includes a plurality of wind speed deviation correction models corresponding to the existing wind farms, and the wind speed deviation correction model represents a relationship between the wind speed deviation and an equivalent factor of the existing wind farm; determining relevant parameters of the target wind farm, determining a matched wind speed deviation correction model in the wind speed deviation correction model library based on the relevant parameters, and correcting the predicted wind speed of the target wind farm based on the determined wind speed deviation correction model.

A correction apparatus for a predicted wind speed of a wind farm is provided according to an aspect of the present disclosure, where the correction apparatus includes: a deviation acquisition program module, configured to establish wind speed deviation matrixes of a plurality of existing wind farms respectively, where a wind speed deviation represents a difference between a predicted wind speed and a measured wind speed of a target anemometer tower of the existing wind farm; a model establishing program module, configured to establish wind speed deviation correction model library based on the wind speed deviation matrixes of the plurality of existing wind farms, where the wind speed deviation correction model library includes a plurality of wind speed deviation correction models corresponding to the existing wind farms, and the wind speed deviation correction model represents a relationship between the wind speed deviation and an equivalent factor of the existing wind farm; a wind speed correction program module, configured to determine relevant parameters of the target wind farm, determine a matched wind speed deviation correction model in the wind speed deviation correction model library based on the relevant parameters, and correct the predicted wind speed of the target wind farm based on the determined matched wind speed deviation correction model.

A computer readable storage medium is provided according to another aspect of the present disclosure, which stores computer programs. When the computer programs are run by a processor, the processor performs the following operations: establishing wind speed deviation matrixes of a plurality of existing wind farms respectively, where a wind speed deviation represents a difference between a predicted wind speed and a measured wind speed of a target anemometer tower of the existing wind farm; establishing a wind speed deviation correction model library based on the wind speed deviation matrixes of the plurality of existing wind farms, where the wind speed deviation correction model library includes a plurality of wind speed deviation correction models corresponding to the existing wind farms, and the wind speed deviation correction model represents a relationship between the wind speed deviation and an equivalent factor of the existing wind farm; determining relevant parameters of the target wind farm, determining the matched wind speed deviation correction model in the wind speed deviation correction model library based on the relevant parameters, and correcting the predicted wind speed of the target wind farm based on the determined wind speed deviation correction model.

A computer device including a processor and a memory storing computer programs is provided according to another aspect of the present disclosure. When the computer programs are run by the processor, the processor performs the above correction method for a predicted wind speed of a wind farm.

In the present disclosure, a model is established by using relationships between wind speed calculation deviations and a plurality of influence factors, and a predicted wind speed of a wind farm is corrected, making up for a deviation problem of the wind speed of the wind farm calculated based on existing fluid models.

BRIEF DESCRIPTION OF THE DRAWINGS

The above and other aspects, features and advantages of exemplary embodiments of the present disclosure will be clearer by the following description in conjunction with the attached drawings. Wherein.

Throughout Figures, same labels will be understood to represent the same elements, features, and structures.

DETAILED DESCRIPTION

A description of the drawings is provided to help fully understand the exemplary embodiments of the present disclosure limited by claims and their equivalents. Reference is made to the following descriptions of the drawings including various specific details to help understanding, but the specific details will only be considered exemplary. Those skilled in the art should note that the changes and modifications can be made to the embodiments described herein without departing the scope and spirit of this disclosure. In addition, for clarity and conciseness, the description of common knowledge functions and structures can be omitted.

Hereinafter, technical terms related to a correction method for a wind speed calculation deviation of a wind farm according to the present disclosure are firstly described.

1. WT Software

WT is a Computational Fluid Dynamics (CFD) commercial software developed by the meidi company for micro-sitting selection, which is a common software currently used for a wind resource analysis in a wind power field. This software performs a wind flow simulation to a wind farm based on a calculation principle of Fluid Mechanics, therefore, a wind flow situation of each position of a wind farm space is known, and then various effects of terrains on the wind flow may be evaluated.

2. Ruggedness Index (RIX)

RIX is a quantitative description of a terrain complexity. In polar coordinates of one point with R as a radius, each radius line may intersect with a contour line, and the intersection points divide the radius line into several segments. By dividing a sum of segments with a topographic slope over a critical slope $\theta$ by a sum of all the segments, the sum of the radius line R and the RIX is obtained. For a target point, the RIX value depends on three parameters: the calculation radius R, the critical slope $\theta$, the number of radius lines N. Generally, the calculation radius R is 3.5 km, the critical slope $\theta$ is 0.3 rad (about 17°), and the number of radius lines N is 72. If the RIX is equal to 0%, it indicates that all the topographic slopes is less than 0.3 rad, and if the RIX is more than 0%, it indicates that the slope in some areas is more than 0.3 rad.

3. Monin-Obukhov Length (MOL)

MOL is a length scale that shows the relative work of the turbulent shear stress and the buoyancy in the near ground layer, commonly used to indicate an overall stability of the near ground layer. The calculation formula is $L=-U^{*}3C_{P}P/\kappa gHR$, where $U^*$ is a friction velocity, Cp is a specific heat, P is an atmospheric pressure, and $\kappa$ is a von karman constant, g is an acceleration of gravity, H is a kinetic heat flux, and R is a gas constant. If L is infinite, it indicates that the atmosphere is neutral, if L is positive, it indicates that the atmosphere is stable, and if L is negative, it indicates that the atmosphere is not stable. Apparently, it can also be classified into finer levels based on numerical values.

Figure 1:
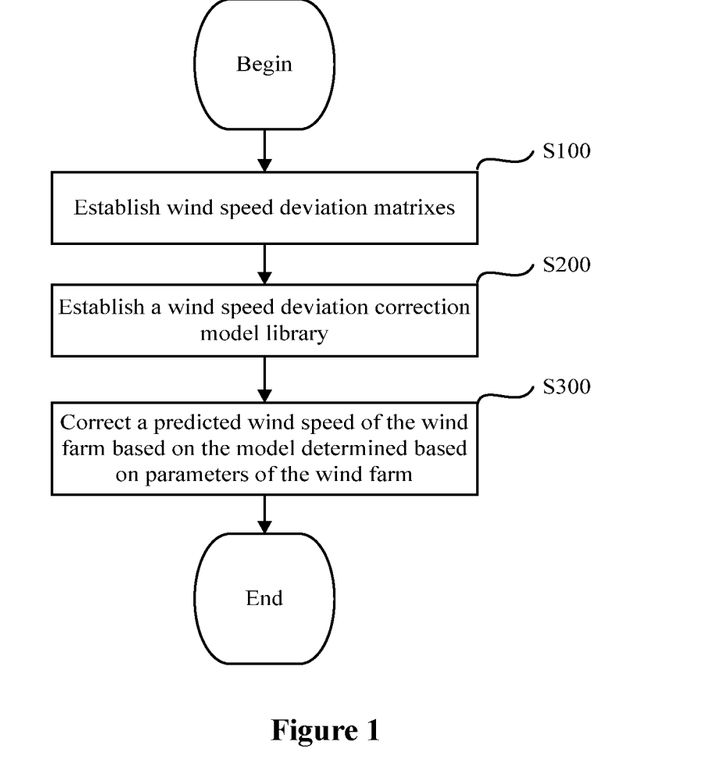
FIG. 1 is a flow chart of a correction method for a predicted wind speed of a wind farm according to an embodiment of the present disclosure.

FIG. 1 is a flow chart showing a correction method for a predicted wind speed of a wind farm according to the embodiment of the present disclosure.

Reference is made to FIG. 1, firstly, in step S100, wind speed deviation matrixes of a plurality of existing wind farms are established respectively, where a wind speed deviation represents a difference between a predicted wind speed and a measured wind speed of a target anemometer tower of the existing wind farm. Specifically, the existing wind farm that meets a predetermined standard is selected, the at least one predicted wind speed of the target anemometer tower is obtained based on the measured wind speed of the at least one anemometer tower in the selected existing wind farm and a fluid model of the selected existing wind farm. Then, the wind speed deviation is calculated based on the at least one predicted wind speed and the measured wind speed of the target anemometer tower, and the wind speed deviation matrix is established. Hereinafter, a process of selecting the existing wind farm that meets the predetermined standard is described in detail.

Based on the embodiments of the present disclosure, since the terrains of the wind farms with a serious distortion of the calculation result of the fluid model are complex, for example, elevation drops are up to a few hundred meters, generally, directions of mountains are not the same, underlying surface is usually provided with trees, farmlands, waters, housing and other environment, and there are some areas where the terrain is not complex but local meteorological conditions changes dramatically, which all lead to a great deviation of prediction results of the fluid model. Based on these qualitative experiences, it is conducive to initially selecting the areas where the wind speed calculation deviation may be great and the wind farm with the greater actual deviation is further selected. In addition, actual measured wind data of the wind farm should be sufficient, and the data quality should be good enough, so that sufficient samples and credible correction equations can be obtained when the deviation matrix is established, and a condition that the deviations of the calculation results are great due to data quality problems may be removed. In this way, the areas where the wind speed calculation deviation may be great can be initially selected, and the wind farm with the greater actual deviation is further selected. Therefore, the wind farm where the calculation results of the fluid model are seriously distorted, the measured data reaches an IEC (International Electrotechnical Commission) data usage standard and at least three anemometer towers are included is taken as the selected wind farm that meets the predetermined standard. In the following embodiments of the present disclosure, it is assumed that the wind farm M that meets the above predetermined standard is selected for the correction of the predicted wind speed of wind farm.

After selecting the wind farm M that meets the predetermined standard, it is necessary to preprocess the measured wind data of the wind farm M to guarantee that an efficiency rate of the data is up to 90% and extract the data of the same period of the all anemometer towers as a wind speed sequence for usage. Then, reference is made to a selection of better existing simulation parameters of the nearby wind farm or the wind farm with the similar terrains and meteorological conditions, prediction parameters of the fluid model of the selected existing wind farm are determined and the wind speed sequence of other anemometer towers except for the target anemometer tower are successively inputted into the fluid model to perform a multi-tower interaction integrated calculation, thereby obtaining the prediction results of the target anemometer tower based on the fluid model. Since an area range of the wind farm are usually large (>10 square kilometers), and a coverage range of a single anemometer tower is only 3 square kilometers, if the wind speed of the whole wind farm is derived based on a single anemometer tower, the larger deviation may be caused. In order to make the predicted wind speed of the target anemometer tower be closer to the real condition and obtain more predicted wind speed samples of the target anemometer tower, in addition to deriving based on a single anemometer tower, the predicted wind speed of the target anemometer tower can also be calculated integratedly based on a plurality of anemometer towers, and one predicted wind speed of the target anemometer tower may be obtained for each integrated calculation.

Based on the embodiments of the present disclosure, after obtaining the predicted wind speed of the target anemometer tower, the wind speed deviation matrixes can be established based on the wind speed deviation between the predicted wind speed and the measured wind speed of the target anemometer tower. Reference is made to Table 1 below to calculate the wind speed deviation matrix:

sents the predicted wind speed at the n-th anemometer tower derived from the m-th anemometer tower, and Vn represents the measured wind speed at the n-th anemometer tower. For example, $E(1,3)=(V_1'-V_3)/V_3$ represents the wind speed deviation obtained by driving the 3rd anemometer tower from the 1st anemometer tower, $V_1'$ represents the predicted wind speed at the 3rd anemometer tower derived from the 1st anemometer tower, and $V_3$ represents the measured wind speed at the 3rd anemometer tower.

Multi-tower integrated deriving formula is as follows:

$$E(a \ \& \ b \ \& \ \ldots \ g, h) = (V_f' - V_h)/V_h$$

The multi-tower integrated deriving indicates that the wind speed deviation obtained by deriving the target anemometer tower h from the a-th, b-th ... g-th anemometer towers, where $V_f'$ represents the predicted wind speed at the h-th anemometer tower obtained based on the multi-tower integrated deriving of the a-th, b-th ... g-th anemometer towers, and $V_h$ represents the measured wind speed at the h-th anemometer tower. For example, $E(2 \ \& \ 3 \ \& \ 4, 1) = (V_f' - V_1)/V_1$ represents the deviation of the wind speed at the 1st anemometer tower derived from the 2nd, 3rd, and 4-th anemometer towers, $V_f'$ represents the predicted wind speed at the 1st anemometer tower derived from the 2nd, 3rd and 4-th anemometer towers, and $V_1$ represents the measured wind speed at the 1st anemometer tower.

It should be noted that there are various ways to integratedly calculate the predicted wind speed of the target

TABLE 1 schematic diagram of wind speed deviation matrix

| measured tower\deriving tower | M1 | M2 | M3 | ... Mn-1 | Mn |
|---|---|---|---|---|---|
| M1 |  | E(1, 2) | E(1, 3) | ... E(1, n-1) | E(1, n) |
| M2 | E(2, 1) |  | E(2, 3) | ... E(2, n-1) | E(2, n) |
| M3 | E(3, 1) | E(3, 1) |  | ... |  |
| ... | ... | ... | ... | ... ... | ... |
| Mn-1 | E(n-1, 1) | E(n-1, 2) | E(n-1, 3) | ... | E(n-1, n) |
| Mn | E(n, 1) | E(n, 2) | E(n, 3) | ... E(n, n-1) |  |
| M1, M2 |  |  | E(1&2, 3) | ... E(1&2, n-1) | E(1&2, n) |
| M1, M3 |  | E(1&3, 2) |  | ... E(1&3, n-1) | E(1&3, n) |
| ... | ... |  | ... | ... ... | ... |
| M1, Mn |  | E(1&n, 2) | E(1&n, 3) | ... E(1&n, n-1) |  |
| M2, M3 | E(2&3, 1) |  |  | ... E(2&3, n-1) | E(2&3, n) |
| M2, M4 | E(2&4, 1) |  | E(2&4, 3) | ... E(2&4, n-1) | E(2&4, n) |
| ... | ... | ... |  | ... ... |  |
| M2, Mn | E(2&n, 1) |  | E(2&n, 3) | ... E(2&n, n-1) |  |
| ... | ... | ... | ... | ... ... | ... |
| Mn-1, Mn | E(n-1&n, 1) | ... | ... | ... ... | ... |
| M1, M2, M3 |  |  |  | ... E(1&2&3, n-1) | E(1&2&3, n) |
| M1, M3, M4 |  | E(1&3&4, 2) |  | ... E(1&3&4, n-1) | E(1&3&4, n) |
| ... | ... | ... | ... | ... ... | ... |
| ... | ... | ... | ... | ... ... | ... |
| M2, M3, ..., Mn | E(2&3& ... n, 1) |  |  | ... |  |

Reference is made to FIG. 1, Mn represents the n-th anemometer tower, the deviation matrix includes results of the wind speed deviation of the target anemometer tower derived from one anemometer tower, two anemometer towers, three anemometer towers ... more anemometer towers. It is assumed that there are x anemometer towers in the wind farm M, x≥3, where the single tower deriving formula is as follows:

$$E(m,n) = (V_m' - V_n)/V_n$$

The single tower deriving formula indicates that the wind speed deviation obtained by driving the n-th target anemometer tower from the m-th anemometer tower, where repreanemometer tower. For example, an inverse ratio of a distance between a reference anemometer tower and the target anemometer tower or an inverse ratio of a square of the distance may be used as a weight to predict the wind speed of the target anemometer tower, and wind speed calculation results of the nearby anemometer tower may also be used to predict the wind speed. Based on the embodiment of the present disclosure, it is assumed that there are three reference anemometer towers and one target anemometer tower in the wind farm M, and the multi-tower integrated deriving adopts the inverse of the distance as the weight, then $V_f' = 1/L_1 * V_1' + 1/L_2 * V_3 + 1/L_3 * V_3'$, where $L_1, L_2, L_3$ are respectively the distances between the first reference anemometer tower, the second reference anemometer tower, the third reference anemometer tower and the target anemometer tower, $V_1'$, $V_2'$ and $V_3'$ are the predicted wind speeds of the target anemometer tower obtained based on a single tower deriving respectively from the three reference anemometer towers, $V_f'$ is the wind speed result of the target anemometer tower derived from the integrated deriving of the three reference anemometer towers.

Herein, in step S200, a wind speed deviation correction model library is established based on the wind speed deviation matrixes of the plurality of existing wind farms, where the wind speed deviation correction model library includes a plurality of wind speed deviation correction models corresponding to the existing wind farms, the wind speed deviation correction model represents a relationship between the wind speed deviation and an equivalent factor of the existing wind farm. Specifically, based on the embodiments of the present disclosure, the wind speed deviation correction model may be established based on the relationship between the wind speed deviation matrix and the equivalent factor of the existing wind farm and the wind speed deviation correction model library is constructed by the plurality of wind speed deviation correction models corresponding to the existing wind farms.

Hereinafter, a process of establishing the wind speed deviation correction model library according to the embodiments of the present disclosure is described in detail. Firstly, influence factors that may affect the wind speed calculation deviation of the fluid model are selected based on the terrain and the meteorological features of the area where the selected existing wind farm is located. For example, in the area where an elevation drop (ΔH) is large, the elevation drop is selected as the influence factor that may affect the wind speed calculation deviation; in the wind farm with large range and less anemometer towers, a distance (L) is selected as the influence factor that may affect the wind speed calculation deviation; in the area with a great change of the underlying surface, the roughness is selected as the influence factor that may affect the wind speed calculation deviation; in the region with a great change of the meteorological condition, the MOL is selected as the influence factor that may affect the wind speed calculation deviation; in the area with a great variation of an overall direction of the mountains, the variation of the direction of the mountains and the variation of the wind direction are selected as the influence factors that may affect the wind speed calculation deviation. Therefore, based on the different background conditions, the possible influence factors of the wind speed calculation deviation are selected. In the following embodiments, it is assumed that the elevation drop (ΔH) is the influence factor of the wind speed calculation deviation of the fluid model of the wind farm M.

For the method for determining a quality of the selected influence factor, it may be determined based on correlation coefficients and may be determined by using a Principal Component Analysis (PCA) and other methods. Sometimes the influence factors may affect each other, or there is a nonlinear relationship between the influence factors and the wind speed deviations.

Then, the equivalent factor is calculated based on the selected influence factor. It may be known that the equivalent factor can also be calculated by using the inverse ratio of distance as the weight based on the multi-tower integrated deriving method from the above elevation drop (ΔH) assumed as the influence factor and the principles of the multi-tower integrated deriving, then the calculation formula of the equivalent factor is as follows:

$$\Delta H = 1/L_1 * \Delta H_1 + 1/L_2 * \Delta H_2 + 1/L_3 * \Delta H_3$$

$L_1$, $L_2$, and $L_3$ are respectively the distances between the first reference anemometer tower, the second reference anemometer tower, and the third reference anemometer tower and the target anemometer tower, $\Delta H_1$, $\Delta H_2$, and $\Delta H_3$ are respectively the elevation drops between the three anemometer towers and the target anemometer tower, and $\Delta H$ is the calculation result of the equivalent factor corresponding to the multi-tower integrated deriving method. If the multi-tower integrated deriving adopts other methods, the calculation of the equivalent factor may also adopt the corresponding calculation formula. In the calculation of the equivalent factor, the influence factor of the calculation deviation in the process of deriving the target anemometer tower from the single tower or integrated deriving from the plurality of towers may be put in the same analogous relationship, furthermore, an optimal configuration, such as the distance, the elevation drop, the roughness difference, with the minimum wind speed predication deviation, may be quantitatively calculated, which is instructive to the selection of the position of the anemometer tower.

Finally, the relationship formula between the equivalent factor and the wind speed calculation deviation, i.e., the wind speed deviation correction model, is established based on the calculation result of the equivalent factor and the constructed wind speed calculation deviation matrix. Based on the embodiments of the present disclosure, an explicit equation such as linear equations, nonlinear equations, or implicit mathematical models (such as various machine learning algorithms) can be used to derive the relationship between the equivalent factor and the wind speed calculation deviation, to obtain the correction model via training and construct the correction model library based on the correction model obtained based on training results of the plurality of selected different wind farms. For example, in a case where the multivariate linear equation method is used to find the relationship between the equivalent factor and the wind speed calculation deviation, the multivariate linear equation may be fit out based on the plurality of equivalent factors of the wind farm and the wind speed calculation deviation value, and the fitting effect of the fitting expression needs to meet a certain standard, then the multivariate linear equation is a correction model. Or a machine learning algorithm such as a neural network and support vector machine may also be used for training to find the existing relationship between the equivalent factor and the wind speed deviation. Generally, this relationship is presented by a weight coefficient matrix of the influence factors, the obtained weight coefficient file is also a correction model, then the correction model library is constructed based on the different correction models obtained based on the training results of a plurality of selected different wind farms.

After establishing the correction model library, then, in step S300, relevant parameters of the target wind farm are determined, and the matched wind speed deviation correction model in the wind speed deviation correction model library is determined based on the relevant parameters, and the wind speed deviation of the target wind farm is further obtained based on the determined wind speed deviation correction model. Specifically, based on the embodiments of the present disclosure, the relevant parameters of the target wind farm are firstly determined, then, the wind speed deviation correction model in the wind speed deviation correction model library established in step S200 is matched based on the determined relevant parameters, the wind speed deviation of the target wind farm is obtained based on the determined wind speed deviation correction model, and the wind speed deviation of the target wind farm is superimposed on the predicted wind speed of the target wind farm calculated through the fluid model, thereby obtaining the corrected predicted wind speed of the target wind farm.

Hereinafter, reference is made to FIG. 2, the process for correcting the predicted wind speed of the target wind farm is described in detail according to the embodiments of the present disclosure.

Figure 2:
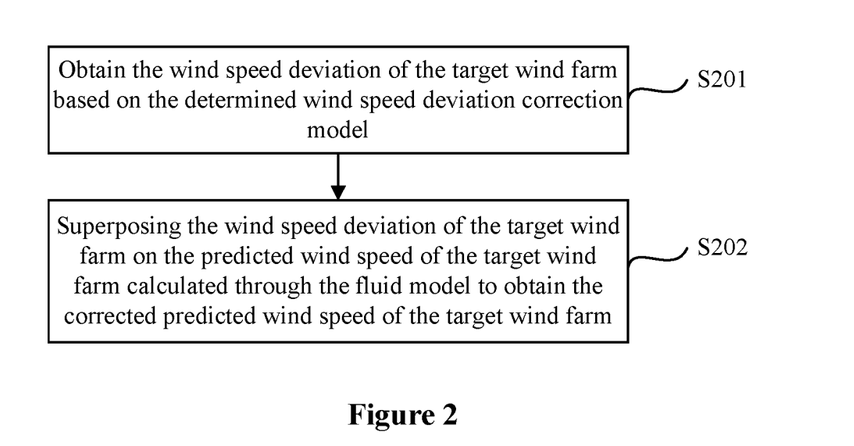
FIG. 2 is a flow chart of a process used for correcting a predicted wind speed of a target wind farm based on a determined matched wind speed deviation correction model according to an embodiment of the present disclosure.

FIG. 2 is a flow chart showing a process used for correcting a predicted wind speed of a target wind farm based on a determined matched wind speed deviation correction model according to the embodiment of the present disclosure.

In step S201, the wind speed deviation of the target wind farm is obtained based on the determined wind speed deviation correction model. Specifically, firstly, the matched wind speed deviation correction model in the wind speed deviation correction model library is determined based on the determined relevant parameters, and the one or more influence factors used for calculating the equivalent factor are obtained based on the determined wind speed deviation correction model. Then, the equivalent factor of the target wind farm is calculated based on the one or more influence factors, and based on the equivalent factor of the target wind farm and the determined wind speed deviation correction model, the wind speed deviation of the target wind farm is obtained. Based on the embodiments of the present disclosure, the relevant parameters that determine the target wind farm may include one of the region where the wind farm is located, the meteorological conditions and the terrain conditions. For example, in China, first, a large region division is performed, China is divided into the northwest region, the northeast region, the north region, the qinghai-tibet plateau, the yunnan-guizhou plateau, the Yangtze river basin, the southeast coastal region and so on. On the basis of large region division, then the division is further performed based on the meteorological conditions, for example, the monin obukhov length L is used to grade the atmospheric stability, herein, L being infinite indicates the neutral atmosphere, L being positive indicates stable atmosphere, and L being negative indicates instable atmosphere. Apparently, it can also be classified into finer levels based on numerical value. In addition, on the basis of the large region division, a subdivision can be performed based on the terrain conditions, for example, the RIX is used to classify the complexity of terrain. If RIX is about equal to 0%, the terrain is defined as a simple terrain, if RIX is greater than 30%, the terrain is defined as a complex terrain, and if RIX is greater than 50%, the terrain is defined as the extremely complex terrain. Apparently, based on the embodiments of the present disclosure, more and finer classification standard can be introduced to divide the jurisdiction of each model into smaller ones, so that the correction effect is more stable. Therefore, the method of determining the relevant parameters of the exemplary embodiment is not limited thereto. In the embodiment below, it is assumed that the matched wind speed deviation correction model determined to be matched in the wind speed deviation correction model library based on the relevant parameters is a statistical relationship category between the wind speed calculation deviation and the elevation drop, then it is determined that the influence factor used for calculating the equivalent factor is the elevation drop.

Based on the embodiments of the present disclosure, step S201 may further include determining whether the obtained wind speed deviation of the target wind farm meets a predetermined constraint condition. Specifically, based on the embodiments of the present disclosure, it is firstly determined whether the obtained wind speed deviation of the target wind farm meets the predetermined constraint condition. In a case where the obtained wind speed deviation of the target wind farm meets the predetermined constraint condition, step S202 is performed, otherwise, the correction model is re-determined to calculate the wind speed deviation of the target wind farm.

In step S202, the wind speed deviation of the target wind farm is superposed on the predicted wind speed of the target wind farm calculated through the fluid model to obtain the corrected predicted wind speed of the target wind farm. Specifically, based on the embodiments of the present disclosure, the wind speed deviation of the target wind farm that meets the predetermined constraint condition is superposed on the predicted wind speed of the target points of the target wind farm calculated through the fluid model to obtain the corrected predicted wind speed of the target wind farm. Based on the embodiments of the present disclosure, for example, in a case where the prediction deviation of the target wind farm meets the constraint condition that the prediction wind speed deviation is less than or equal to the predicted wind speed, the wind speed deviation is superposed to calculate the corrected wind speed of the target wind farm, otherwise, the prediction deviation that exceeds the constraint condition is dropped, and the new correction model is re-screened to predict the wind speed deviation again and obtain the corrected wind speed, thereby further calculating the corrected power generation amount.

In the present disclosure, the establishment method of the correction model library and the relevant parameters are updated with the increasing number of experimental samples, therefore, the exemplary embodiment is a continuous iterative process. In the exemplary embodiments, the deviation influence factor is accumulated, and the relevant parameters are constantly replenished, the correction model is continuously optimized, the features and the reasons of the calculation deviation of the fluid model are increasing. For example, in an area with unstable meteorological conditions, the wind speed of the whole wind farm calculated based on the fluid model is always small, and the elevation drop of the area is relatively small, that is the predicted wind speed calculated based on the fluid model under the condition is generally small, it is illustrated that original equations or parameter configuration in the fluid model can be adjusted in the area or under this condition. Similar experiences are accumulated to modify the fluid model to improve the prediction effect of the fluid model in more specific wind farms.

Figure 3:
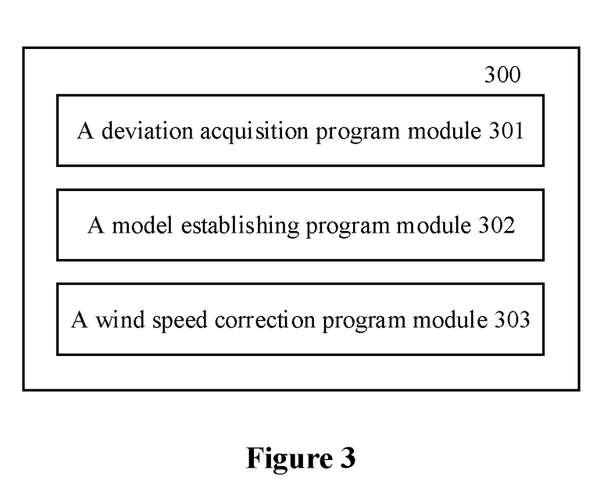
FIG. 3 is a block diagram of a correction apparatus for a predicted wind speed of a wind farm according to an embodiment of the present disclosure.

FIG. 3 is a block diagram showing a correction apparatus for a predicted wind speed of a wind farm according to the embodiment of the present disclosure.

As shown in FIG. 3, a correction apparatus for predicting a wind speed of a wind farm 300 includes: a deviation acquisition program module 301, a model establishing program module 302 and a wind speed correction program module 303. Based on the embodiments of the present disclosure, a correction apparatus for predicting a wind speed of a wind farm 300 may be implemented through various calculation apparatuses (such as a computer, a server, a work station, etc). Specifically, the deviation acquisition program module 301 is configured to establish wind speed deviation matrixes of a plurality of existing wind farms respectively, where a wind speed deviation represents a difference between a predicted wind speed and a measured wind speed of a target anemometer tower of the existing wind farm. The model establishing program module 302 is configured to establish wind speed deviation correction model library based on the wind speed deviation matrixes of the plurality of existing wind farms, where the wind speed deviation correction model library includes a plurality of wind speed deviation correction models corresponding to the existing wind farms, and the wind speed deviation correction model represents a relationship between the wind speed deviation and an equivalent factor of the existing wind farm. A wind speed correction program module 303 is configured to determine relevant parameters of the target wind farm, determine the matched wind speed deviation correction model in the wind speed deviation correction model library based on the relevant parameters, and further correct the predicted wind speed of the target wind farm based on the determined wind speed deviation correction model.

The deviation acquisition program module 301 selects an existing wind farm which meets the predetermined standard that the calculation results of the fluid model is seriously distorted, the measured data reaches an IEC data usage standard and at least three anemometer towers are included. The measured wind data of the selected existing wind farm is preprocessed to remove invalid data. Simulation parameters of the fluid model of the existing wind farm are determined by referring to the simulation parameters of the existing fluid model of the wind farm that has conditions similar to the selected existing wind farm. The measured wind data of the at least one anemometer tower except for the target anemometer tower are inputted into the fluid model to perform integrated calculation to obtain at least one predicted wind speed, and the wind speed deviation matrix is calculated based on the at least one obtained predicted wind data of the target anemometer tower and the measured wind speed of the target anemometer tower.

The model establishing program module 302 selects the influence factors that affect the wind speed calculation deviation of the fluid model of the selected wind farm based on the terrain and the meteorological features of the regions where the selected existing wind farm is located, and calculates the equivalent factors through the multi-tower integrated principle based on the selected influence factors, where the multi-tower integrated principle is to calculate the equivalent factors of the selected influence factors in the fluid model based on the calculation principle of deriving the wind speed deviation between the predicted wind speed of the target anemometer tower and the measured wind speed based on the plurality of anemometer towers. Based on the calculated equivalent factors and the wind speed deviation matrix obtained in the deviation acquisition program module 301, the relationship between the wind speed deviation and the equivalent factor is found, training is performed through explicit equations or implicit mathematical models to obtain the correction model, and the wind speed deviation correction model library is constructed based on the plurality of correction models established based on the selected different wind farms.

Hereinafter, reference is made to FIG. 4 for describing the wind speed correction program module 303 according to the embodiment of the present disclosure in detail.

Figure 4:
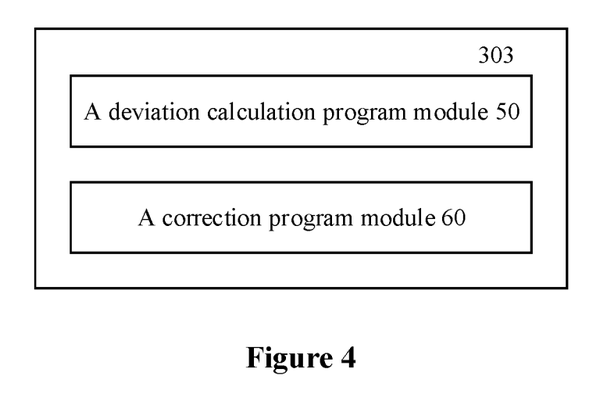
FIG. 4 is a block diagram of a wind speed correction program module according to an embodiment of the present disclosure.

FIG. 4 is a block diagram showing a wind speed correction program module according to the embodiment of the present disclosure.

Reference is made to FIG. 4. The wind speed correction program module 303 includes a deviation calculation program module 50 and a correction program module 60. The deviation calculation program module 50 obtains the wind speed deviation of the target wind farm based on the determined wind speed deviation correction model, and the correction program module 60 superposes the wind speed deviation obtained in the deviation calculation program module 50 to the predicted wind speed of the target wind farm calculated through the fluid model to obtain the corrected predicted wind speed of the target wind farm. The wind speed deviation correction model determined in the deviation calculation program module 50 is obtained by matching in the wind speed deviation correction model library based on the determined relevant parameters of the target wind farm. The relevant parameters at least include one of the regions, meteorological conditions and terrain conditions of wind farms.

Figure 5:
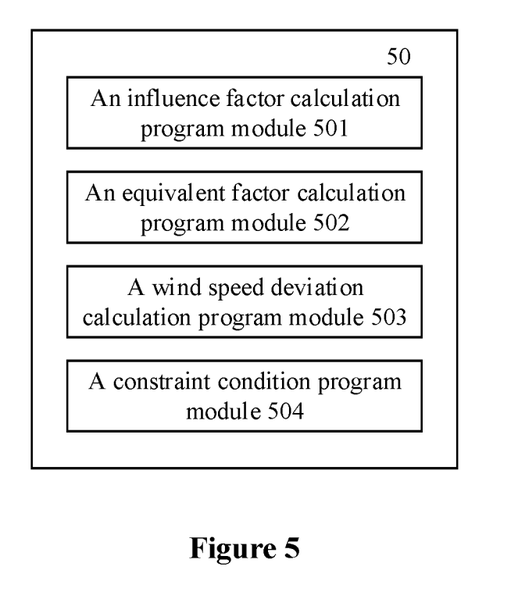
FIG. 5 is a block diagram of a deviation calculation program module according to an embodiment of the present disclosure.

Reference is made to FIG. 5 for describing the deviation calculation program module 50 according to the embodiment of the present disclosure in detail.

FIG. 5 is a block diagram of a deviation calculation program module according to the embodiment of the present disclosure.

As shown in FIG. 5, the deviation calculation program module 50 includes an influence factor calculation program module 501, an equivalent factor calculation program module 502 and a wind speed deviation calculation program module 503. The influence factor calculation program module 501 obtains one or more influence factors used for calculating the equivalent factor based on the determined wind speed deviation correction model. The equivalent factor calculation program module 502 calculates the equivalent factor of the target wind farm based on the one or more equivalent factors. The wind speed deviation calculation program module 503 obtains the wind speed deviation of the target wind farm based on the equivalent factor of the target wind farm and the determined wind speed deviation correction model.

Based on the embodiments of the present disclosure, the deviation calculation program module 50 further includes a constraint condition program module 504. The constraint condition program module 504 is configured to determine whether the obtained wind speed deviation of the target wind farm meets the predetermined constraint condition. In a case where the predetermined constraint condition is met, the wind speed prediction deviation of the target wind farm that meets the predetermined constraint condition is superposed on the predicted wind speed of target points of the target wind farm calculated through the fluid model of the target wind farm to obtain the corrected wind speed; otherwise, the correction model is re-screened to correct the wind speed deviation of the target wind farm.

Based on the correction method and correction apparatus for predicting the wind speed of the wind farm according to the embodiment of the present disclosure, the correction method uses a relationship between wind speed calculation deviation and a plurality of influence factors to correct the wind speed deviation of the wind farm, making up for a deviation problem of the wind speed calculated based on existing fluid model.

A correction method for a predicted wind speed of a wind farm according to the embodiment of the present disclosure may be implemented to computer readable codes stored in the computer readable recording medium or may be transmitted through transmission medium. The computer readable recording medium is any data storage device that may store the data read by the computer system hereinafter. The computer readable recording medium includes the read-only memory (ROM), random access memory (RAM), compact disc (CD)-ROM, digital versatile disc (DVD), tape, floppy disk, optical data storage devices, not limited thereto. The transmission medium may include a carrier transmitted through a network or various types of communication channels. The computer readable recording medium can also be distributed to a computer system connected to the network, thereby allowing the computer readable codes to be stored and executed in a distributed manner.

Although the specific exemplary embodiments of the present disclosure are referred to describe the present disclosure, those skilled in the art should understand that various changes of forms and details can be made without departing the spirit and scope of the present disclosure claimed in claims and equivalents thereof.

The invention claimed is:

1. A correction method for a predicted wind speed of a wind farm, comprising:
   establishing a wind speed deviation matrix of a plurality of existing wind farms respectively, where a wind speed deviation represents a difference between a predicted wind speed and a measured wind speed of a target anemometer tower of the existing wind farm;
   establishing a wind speed deviation correction model library based on the wind speed deviation matrixes of the plurality of existing wind farms, where the wind speed deviation correction model library comprises a plurality of wind speed deviation correction models corresponding to the existing wind farms, and the wind speed deviation correction model represents a relationship between the wind speed deviation and an equivalent factor of the existing wind farm; and
   determining relevant parameters of the target wind farm, determining a matched wind speed deviation correction model in the wind speed deviation correction model library based on the relevant parameters, and correcting the predicted wind speed of the target wind farm based on the determined wind speed deviation correction model;
   wherein the correcting the predicted wind speed of the target wind farm based on the determined wind speed deviation correction model comprises:
     obtaining the wind speed deviation of the target wind farm based on the determined wind speed deviation correction model; and
     superposing the wind speed deviation of the target wind farm on the predicted wind speed of the target wind farm calculated through a fluid model to obtain the corrected wind speed of the wind farm;
   wherein the obtaining the wind speed deviation of the target wind farm based on the determined wind speed deviation correction model comprises:
     obtaining one or more influence factors used for calculating the equivalent factor based on the determined wind speed deviation correction model;
     calculating the equivalent factor of the target wind farm based on the one or more influence factors; and
     obtaining the wind speed deviation of the target wind farm based on the equivalent factor of the target wind farm and the determined wind speed deviation correction model.

2. The correction method according to claim 1, wherein the obtaining the wind speed deviation of the target wind farm based on the determined wind speed deviation correction model further comprises:
   determining whether the obtained wind speed deviation of the target wind farm meets a predetermined constraint condition, and in a case where the obtained wind speed deviation of the target wind farm meets the predetermined constraint condition, superposing the wind speed deviation of the target wind farm on the predicted wind speed of the target wind farm calculated through the fluid model to obtain the corrected wind speed of the target wind farm.

3. The correction method according to claim 1, wherein deriving the predicted wind speed of the target anemometer tower based on the measured wind data of one or more anemometer towers except for the target anemometer tower in the existing wind farm.

4. The correction method according to claim 1, wherein the relevant parameters at least comprise one of the regions, meteorological conditions and terrain conditions of the wind farm.

5. A correction apparatus for a predicted wind speed of a wind farm, comprising a processor and a memory storing computer programs, wherein the computer programs, when run by the processor, cause the processor to:
   establish wind speed deviation matrixes of a plurality of existing wind farms respectively, where a wind speed deviation represents a difference between a predicted wind speed and a measured wind speed of a target anemometer tower of the existing wind farm;
   establish wind speed deviation correction model library based on wind speed deviation matrixes of the plurality of existing wind farms, where the wind speed deviation correction model library comprises a plurality of wind speed deviation correction models corresponding to the existing wind farms, and the wind speed deviation correction model represents a relationship between the wind speed deviation and an equivalent factor of the existing wind farm;
   determine relevant parameters of the target wind farm, determine a matched wind speed deviation correction model in the wind speed deviation correction model library based on the relevant parameters, and correct the predicted wind speed of the target wind farm based on the determined wind speed deviation correction model;
   wherein the computer programs further cause the processor to:
     obtain the wind speed deviation of the target wind farm based on the determined wind speed deviation correction model; and
     superpose the wind speed deviation of the target wind farm to the predicted wind speed of the target wind farm calculated through a fluid model to obtain the corrected predicted wind speed of the target wind farm;
   wherein the computer programs further cause the processor to:
     obtain one or more influence factors used for calculating the equivalent factor based on the determined wind speed deviation correction model;
     calculate the equivalent factor of the target wind farm based on the one or more equivalent factors;
     obtain the wind speed deviation of the target wind farm based on the equivalent factor of the target wind farm and the determined wind speed deviation correction model.

6. The correction apparatus according to claim 5, wherein the computer programs cause the processor to:

determine whether the obtained wind speed deviation of the target wind farm meets the predetermined constraint condition, wherein in a case that the obtained wind speed deviation of the target wind farm meets the predetermined constraint condition, the processor superposes the obtained wind speed deviation of the target wind farm on the predicted wind speed of the target wind farm calculated through the fluid model to obtain the corrected wind speed of the target wind farm.

7. The correction apparatus according to claim 5, wherein the computer programs cause the processor to derive the predicted wind speed of the target anemometer tower from the measured wind data of the one or more anemometer towers except for the target anemometer tower in the existing wind farm.

8. The correction apparatus according to claim 5, wherein the relevant parameters at least comprise one of the regions, meteorological conditions and terrain conditions of the wind farm.

9. A non-transitory computer readable storage medium, storing a computer program, wherein when the computer program is run by a processor, the processor performs the following operations:

establishing wind speed deviation matrixes of a plurality of existing wind farms respectively, where a wind speed deviation represents a difference between a predicted wind speed and a measured wind speed of a target anemometer tower of the existing wind farm;

establishing a wind speed deviation correction model library based on wind speed deviation matrixes of the plurality of existing wind farms, where the wind speed deviation correction model library comprises a plurality of wind speed deviation correction models corresponding to the existing wind farms, and the wind speed deviation correction model represents a relationship between the wind speed deviation and an equivalent factor of the existing wind farm; and determining relevant parameters of the target wind farm, determining the matched wind speed deviation correction model in the wind speed deviation correction model library based on the relevant parameters, and correcting the predicted wind speed of the target wind farm based on the determined wind speed deviation correction model;

wherein the correcting the predicted wind speed of the target wind farm based on the determined wind speed deviation correction model comprises:

obtaining the wind speed deviation of the target wind farm based on the determined wind speed deviation correction model; and superposing the wind speed deviation of the target wind farm on the predicted wind speed of the target wind farm calculated through a fluid model to obtain the corrected wind speed of the wind farm;

wherein the obtaining the wind speed deviation of the target wind farm based on the determined wind speed deviation correction model comprises:

obtaining one or more influence factors used for calculating the equivalent factor based on the determined wind speed deviation correction model;

calculating the equivalent factor of the target wind farm based on the one or more influence factors; and obtaining the wind speed deviation of the target wind farm based on the equivalent factor of the target wind farm and the determined wind speed deviation correction model.

* * * * *